United States Patent Office
3,639,362
Patented Feb. 1, 1972

3,639,362
ADAMANTANE ACRYLATE AND METHACRY-LATE ESTERS AND POLYMERS THEREOF
Irl N. Duling, West Chester, and Abraham Schneider, Overbrook Hills, Pa., and Robert E. Moore, Wilmington, Del., assignors to Sun Oil Company, Philadelphia, Pa.
No Drawing. Continuation-in-part of application Ser. No. 625,581, Mar. 24, 1967, now Patent No. 3,518,241. This application Mar. 13, 1969, Ser. No. 807,068
The portion of the term of the patent subsequent to June 20, 1987, has been disclaimed
Int. Cl. C08f 15/16
U.S. Cl. 260—78.5                                    11 Claims

ABSTRACT OF THE DISCLOSURE

Novel copolymers having low mold shrinkage properties are prepared from adamantane acrylate and methacrylates of the structure

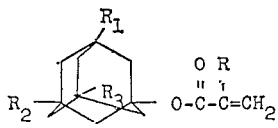

where R is hydrogen or methyl and $R_1$, $R_2$ and $R_3$ are preferably alkyl or cycloalkyl radicals having 1–20 carbon atoms and a second polymerizable unsaturated monomer such as methyl methacrylate, styrene, acrylonitrile, and vinyl chloride.

---

This application is a continuation-in-part of Ser. No. 625,581 filed Mar. 24, 1967 now U.S. Pat. 3,518,241.

This invention relates to copolymers of unsaturated esters containing an adamantane nucleus and more particularly to alkyl- and/or cycloalkyl-substituted adamantyl esters of acrylic acid or methacrylic acid wherein the adamantane moiety has 1–4 alkyl and/or cycloalkyl substituents.

The cage-like structure of the adamantane nucleus has been illustrated in several ways, of which the following is one example:

As can be seen, it consists of three condensed cyclohexane rings arranged so that there are four bridgehead carbon atoms which are equivalent to each other. In view of these bridgehead carbon atoms, dehydrogenation to form an olefinic double bond within the nucleus cannot occur, and hence the nucleus tends to exhibit good thermal stability.

Numerous types of adamantane derivatives have been disclosed in the prior art and a comprehensive tabulation thereof has been presented by Stetter, Angew. Chem. (English ed.), 1 (6), pp. 286–298 (1962). However, acrylate and methacrylate esters containing the adamantane nucleus do not appear to have been made heretofore.

The present invention is directed to and provides copolymers of esters of acrylic acid and methacrylic acid which esters contain one adamantane nucleus per molecule. More specifically, these esters correspond to the formula

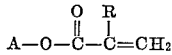

wherein R is hydrogen or methyl depending upon whether the esters are derivatives, respectively, of acrylic acid or methacrylic acid, and A is an adamantane moiety having 1–4 substituents on the adamantane nucleus which substituents are alkyl or cycloalkyl radicals each having 1–20 carbon atoms. The carboxyl group of these esters is attached to moiety A at a bridgehead carbon atom of the adamantane nucleus.

Preferred adamantane compounds have 1–3 alkyl and/or cycloalkyl groups all attached to the adamantane nucleus at bridgehead positions. More particularly, the preferred esters correspond to the formula

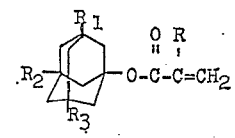

wherein R is hydrogen or methyl, $R_1$ and $R_2$ are radicals having 0–20 carbon atoms selected from the group consisting of hydrogen, alkyl and cycloalkyl, and $R_3$ is an alkyl or cycloalkyl radical having 1–20 carbon atoms. In this preferred class of adamantane components, the adamantane nucleus thus has one, two or three hydrocarbyl substituents located at bridgehead positions, which substituents are alkyl, cycloalkyl or combinations thereof.

The above-defined acrylate and methacrylate esters are useful as monomers for preparing solid polymers which can be either homopolymers or copolymers with other vinyl monomers. Such polymers can be made by polymerizing or copolymerizing the foregoing esters by free radical catalysis in conventional manner.

The presence of the bulk adamantyl groups along the polymer chain gives extraordinarily high glass transition temperatures for the homo-polymers and copolymers and imparts high temperature stability characteristics as discussed hereinafter.

Briefly stated the present invention is a copolymer comprising repeating units of moieties derived from an unsaturated ester having the formula

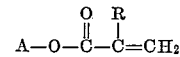

and a second polymerizable unsaturated monomer, wherein R is hydrogen or methyl and A is an adamantane moiety having 1–4 substituents on the adamantane nucleus which substituents are alkyl or cycloalkyl radicals having 1–20 carbon atoms, the carboxyl group being attached to A at a bridgehead carbon atom.

The monomer esters can be prepared by esterifying acrylic or methacrylic acid, or more preferably their acid chlorides, with an adamantyl monool or the formula AOH where A is as above defined and the hydroxyl group is attached to A at a bridgehead position. Substituted adamantyl monools or alcohols for making the prepared esters correspond to the formula

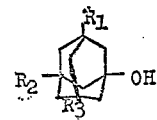

wherein the several R groups are as previously defined. These alcohols, in which all alkyl groups are at bridgehead positions, can be prepared from mono-, di- or tri-alkylated adamantane hydrocarbons corresponding to the alkyl or cycloalkyladamantyl moiety desired in the product. While the number of carbon atoms in each alkyl or cycloalkyl group can vary widely ranging up to 20, it is usually preferable that these groups be methyl and/or ethyl since the parent hydrocarbons corresponding thereto are more readily obtainable. Thus the alkyladamantyl moiety, i.e.,

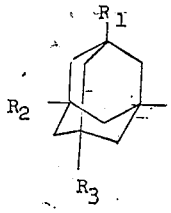

desirably is selected from the following: 1-methyladamantyl; 1,3-dimethyladamantyl; 1-ethyladamantyl; 1-methyl-3-ethyladamantyl; 1,3,5-trimethyladamantyl; and 1,3-dimethyl-5-ethyladamantyl.

The adamantyl alcohols used for making esters according to the invention can also have one or more of the R group positioned at non-bridgehead positions of the adamantane nucleus. Thus the A group in the alcohol can be an adamantane nucleus having from one to four alkyl and/or cycloalkyl substituents attached thereto at non-bridgehead positions or at both non-bridgehead and bridgehead positions. Examples of these less preferred alcohols for practicing the invention are as follows: 2-methyladamantanol-1; 4-methyladamantanol-1; 4-ethyladamantanol-1; 2,5-dimethyladamantanol-1; 2,4-dimethyladamantanol-1; 4-methyl-3-ethyladamantanol-1; 2,4,6-trimethyladamantanol-1; 2,4,5,7-trimethyladamantanol-1; and 2,3,4-trimethyl-7-ethyladamantanol-1; and higher molecular weight adamantanols corresponding to the foregoing but having higher alkyl and/or cycloalkyl radicals in place of one or more of the methyl or ethyl substituents.

Preparation of the parent hydrocarbons corresponding to alkyl or cycloalkyladamantane moieties as above specified can be carried out by aluminum halide or HF-BF₃ catalyzed isomerization of saturated tricyclic hydrocarbons, as disclosed by Schleyer et al., Tetrahedron Letters No. 9, pps. 305–309 (1961) and Schneider et al., JACS, vol. 86, pp. 5365–5367 (1964), and in U.S. Pat. Nos. 3,128,316 and 3,275,700. Higher alkyl or cycloalkyl groups can be substituted on the admantane nucleus by a Wurtz synthesis involving reacting bridgehead chloro- or bromoadamantanes with alkali metal alkyls or cycloalkyls in the manner disclosed by Spengler et al., Erdöl and Kohle-Erdgas-Petrochemie, vol. 15, pp. 702–707 (1962). Other procedures of making alkyl- or cycloalkyl-substituted adamantanes are described in Schneider United States application Ser. No. 613,443, filed Feb. 2, 1967, now U.S. Pat. No. 3,382,288, and in an article by Hoek et al., 85 (1966), Recueil 1045–1053. The alkylated adamantanes can, for the present purpose, have either non-branched or branched alkyl groups and can have one or more cycloalkyl radicals in the alkylation moiety with the total number of carbon atoms in each group substituted on the adamantane nucleus ranging up to twenty. Preferably these substituents contain no tertiary hydrogen atoms.

It is also preferable that at least one of the $R_1$ and $R_2$ groups be alkyl or cycloalkyl so that the substituted adamantyl moiety will contain not more than one unsubstituted bridgehead position. This renders the product less susceptible to oxidation. For best oxidation resistance both $R_1$ and $R_2$ are alkyl or cycloalkyl groups so that the nucleus has no tertiary hydrogen substituent.

The starting alkylated adamantane hydrocarbon is first converted to a 1-monool for use as reactant in preparing the present esters. One manner of effecting such conversions is by air oxidation of the parent hydrocarbons at, for example, 160° C. in the presence of a metal salt oxidation catalyst, as disclosed in Schneider United States application Ser. No. 395,557, filed Sept. 10, 1964, now U.S. Pat. No. 3,356,740. In the oxidation monools form first and these will subsequently convert to diols if the reaction is allowed to continue too far. Some amounts of ketones are also formed during the oxidation. Production of the monools can be maximized by stopping the oxidation before 70% conversion has been reached.

Another way of preparing 1-monools of the substituted adamantanes is by reacting the latter with an acetic acid solution of chromic acid, as disclosed in Moore, United States application Ser. No. 421,614, filed Dec. 28, 1964, now abandoned. By using a relatively low mole ratio of Cr to hydrocarbon such as 3:2 good yields of the monool can be obtained.

Preparation of the ester product can be accomplished by known esterification methods. One method comprises refluxing a mixture of acrylic or methacrylic acid and the alkyladamantyl alcohol dissolved in a suitable solvent such as benzene, toluene or heptane and in the presence of an esterification catalyst such as p-toluene sulfonic acid, and trapping out water from the reflux condensate as the esterification reaction proceeds.

The preferred esterification procedure involves reacting the alkyladamantyl alcohol with acrylyl or methacrylyl chloride in accordance with the following equation:

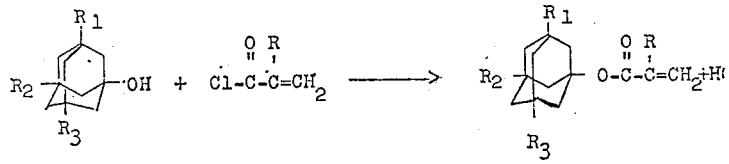

This reaction is carried out by dissolving the alcohol in a hydrocarbon solvent, such as benzene, toluene, hexane, heptane or the like, adding a tertiary amine to the mixture in molar excess relative to the alcohol, and then slowly adding the acid chloride thereto. The amine used preferably is triethylamine, although other tertiary amines such as pyridine, tributylamine, N,N,N',N'-tetramethylethylenediamine, triethylenediamine, picolines, quinoline and the like can be employed. Upon addition of the acid chloride, the initial reaction that takes place involves the formation of a complex between it and the amine. This reaction is exothermic and the complex precipitates as it is formed. Slow addition of the acid chloride is continued preferably until the amount added is in molar excess of the alcohol. The resulting slurry is then stirred at a temperature in the range of 10–65° C., more preferably 20–60° C., to effect the esterification reaction. A temperature above 65° C. should be avoided as this tends to cause a messy reaction, and it is most preferable to maintain the temperature at 40–50° C. Time required for completion of the reaction will depend upon the reaction temperature used but generally is in the range of 1–20 hours.

As the reaction occurs the amine-acid chloride complex is replaced by an amine-HCl complex which is also insoluble in the hydrocarbon solvent. The alkyladamantyl-acrylate or methacrylate product on the other hand remains in solution. After completion of the reaction, the mixture is filtered to remove the amine-HCl complex and the solvent is removed by evaporation. The crude product ester obtained as residue is a reddish liquid. This can be purified by vacuum distillation, after addition of a polymerization inhibitor such as hydroquinone or bis(2-hydroxy-3-t-butyl - 5 - methylphenyl)methane, to give a sweet smelling, colorless liquid as the desired ester product.

The alkylated adamantane acrylates and methacrylates prepared as above described can be polymerized or copolymerized in conventional manner by free radical catalysis using a free radical initiator such as hydrogen peroxide, benzoyl peroxide, dicumyl peroxide, di-t-butyl-peroxide or azobisisobutyronitrile. Procedures for polymerizing and copolymerizing acrylates and methacrylates are well known and need not be elaborately described here. Discussion of such procedures and of numerous uses of the resin products are given in Encyclopedia of Chemical Technology, vol. 1, 2nd ed. (1963), pp. 303–311, and similar procedures are applicable here for preparing polymers and copolymers having analogous uses. The present acrylates and methacrylates can be polymerized alone or together, or can be copolymerized with other unsaturated monomers, e.g., ethylene, propylene, butadiene, vinylcyclohexene, dicyclopentadiene, vinylacetate, acrylonitrile, methacrylonitrile, styrene, α-methyl or α-chlorostyrene, vinylchloride, vinylidene chloride, methacrylate, methylmethacrylate, vinylpyrrolidone, vinylpyridine, maleic anhydride, and methyl or ethyl vinyl ether and the like.

The polymerization or copolymerization reaction preferably is carried out employing a solvent such as benzene or toluene at elevated temperature such as 50–80° C. The acrylate or methacrylate monomer is dissolved in the solvent, a small amount such as 0.05–0.5% of the free radical initiator is added to the mixture, the mixture is degassed and then heated to and maintained at the selected temperature level until the desired degree of polymerization has been attained. The polymer, which remains in solution, can then be recovered in conventional manner by adding an antisolvent such as methanol, separating the precipitated polymer and drying.

The polymerization also can be carried out without a solvent, and the polymer in such case usually will be cross-linked and at least partially insoluble in organic solvents. Consequently such bulk polymerizations are generally applicable where the polymer is to be produced in the form desired for use, for example, as a cast form or sheet. In carrying out these polymerizations a suitable free radical initiator, such as benzoyl peroxide or azobisisobutyronitrile, is dissolved in the alkyladamantyl-acrylate or methacrylate, the mixture is degassed and polymerization conditions are established by heating to say 60° C. or by the application of ultraviolet light at room temperature. Polymerization with cross-linking readily occurs, giving a hard glassy polymer. Use of the present monomers in place of conventional acrylates or methacrylates in such bulk polymerizations can be distinctly advantageous in that substantially less shrinkage occurs. For example, with methyl methacrylate 25–30% shrinkage may occur, whereas for the copolymers 7–18% shrinkage is typical.

The acrylate and methacrylate monomers of the present invention can also be polymerized to high molecular weight polymers by means of anionic catalysts. This kind of catalysis for making polymers and copolymers from other types of acrylates and methacrylates has been described in various literature references and similar conditions for anionic polymerization of the present monomers can be used. Examples of anionic catalysts which have been employed are: Grignard reagents such as alkyl or phenyl magnesium bromide (Garrett et al., JACS, 81, 1007–1008 (1959), and Gaylord et al., Linear and Stereospecific Addition Polymers, 531 (1959)); butyllithium or fluorenylsodium (Graham et al., JACS, 82, 2100–2103 (1960)); sodium naphthalene (Graham et al., J. Poly. Sci., 44, 411–419 (1960)); and lithium dispersions (Miller et al., JACS, 80, 4115–4116 (1958)).

Resins containing the alkyladamantyl or cycloalkyl-adamantylacrylate or methacrylate moieties of the present invention have extraordinarily high glass transition temperatures by virtue of the bulky adamantyl groups appended along the polymer chain. These resins accordingly have high softening points permitting their use at relatively high temperatures and they also have high surface hardness characteristics. Further they have high refractive indexes and, thus, are particularly useful as optical lens material.

The unusually high glass transition temperatures ($T_g$) of the present polymers and copolymers can be seen by comparison with $T_g$ values reported in the literature for conventional polyacrylates and polymethacrylates. Typical $T_g$ values for conventional polymers are given in Encyclopedia of Chemical Technology, loc. cit., p. 308, and by Krause et al., J. Poly. Sci., 3, 3573–3586 (1965). For polyacrylates made from various alkyl esters, these references show $T_g$ values ranging from −80° C. (for n-octyl) to 94° C. (norbornyl). In comparison, $T_g$ values found for our homopolymers made from the bridgehead acrylate of 3,5-dimethyladamantanol-1 typically are 100–107° C. Further, the prior art shows $T_g$ values for polymers of alkyl methacrylates ranging from 20° C. (butyl) to 140° C. (3,3,5-trimethylcyclohexyl) whereas typical $T_g$ values for our polymethacrylate products derived from 3,5-dimethyladamantanol-1 are 190–198° C.

The effect of the adamantyl moiety has likewise a similar effect in the copolymer composition. For example, polymethyl methacrylate (PMMA) has a $T_g$ of 115° C. whereas a methyl methacrylate-dimethyl adamantane methacrylate (mole ratio 52:45) copolymer has a $T_g$ of 155° C. In order to achieve the full benefit from the copolymers of the present invention such copolymers should contain at least 5 wt. percent up to about 95 wt. percent of the adamantane derived moiety, more preferably 20 to 90 wt. percent.

Still another advantage of resins of the present invention results from the stability of the adamantane nucleus as mentioned above. Ester groups made from conventional alcohols of two or more carbon atoms can undergo thermal decomposition by transfer of a hydrogen atom from the beta position of the alcohol-derived moiety in the following manner:

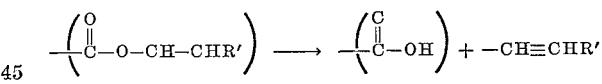

This type of decomposition results, as shown, in the conversion of the ester group to a carboxylic acid group and an olefin. While prior art acrylate or methacrylate resins can undergo this type of decomposition at high temperature, resins made from the present ester products cannot as this would require the formation of a double bond in the adamantane nucleus which, as previously stated, cannot occur.

The following examples will illustrate the invention:

EXAMPLE 1

This illustrates the preparation of 3,5-dimethyl-1-adamantylacrylate by the reaction of 3,5-dimethyl-1-adamantanol (DMAO) with acrylyl chloride. 10 g. of DMAO (0.055 mole) were dissolved in a mixture of 75 ml. of benzene and 5 ml. of pyridine (0.062 mole). Acrylyl chloride in amount totaling 5.4 g. (0.06 mole) was added dropwise over a time of 0.5 hour while the mixture was stirred and cooled. A complex between the acrylyl chloride and pyridine precipitated, forming a slurry. The mixture was stirred for 6 hours at room temperature to complete the reaction. The pyridine-HCl complex that had been formed was separated by filtering the mixture, and solvent was evaporated from the filtrate leaving a reddish liquid residue. This was shown by vapor phase chromatography and IR analysis to be mainly 3,5-dimethyl-1-adamantylacrylate. To the crude product was added a small amount of a polymerization inhibitor, viz bis (2-hydroxy-3-t-butyl-5-methylphenyl)methane, and the mixture was then vacuum distilled to give 6 g. of pure 3,5-dimethyl-1-adamantylacrylate. This product was a colorless, sweet-smelling liquid having the following properties:

| | |
|---|---|
| Density, 20°/4° | 1.0255 |
| Refractive index | 1,4873 |
| Refractive dispersion at 20° | 104 |
| Hydrogen red line | 1.4847 |
| Hydrogen blue line | 1.4951 |
| KV at 100° F., cs. | 7.2 |

EXAMPLE 2

The same ester as in Example 1 was again prepared but using acrylic acid instead of the acid chloride. A solution of 12.01 g. of acrylic acid and 9.98 g. of DMAO (acid: alcohol molar ratio=3:1) in 250 ml. of toluene was prepared and 0.5 g. of ptoluene sulfonic acid was added as esterification catalyst. The mixture was then refluxed and water formed in the reaction was trapped out of the condensate. After 28 hours 0.5 g. more of the catalyst was added and refluxing was continued for a total time of 72 hours. The reaction mixture was then washed with aqueous $Na_2CO_3$ and dried, and the solvent was evaporated. The residue was distilled and a fraction (5.12 g.) of substantially pure 3,5-dimethyl-adamantyl-acrylate having essentially the same properties as given in Example 1 was obtained.

Comparison of reaction times for Examples 1 and 2 shows that esterification of the DMAO is more readily achieved by using the acrylyl chloride rather than acrylic acid.

EXAMPLE 3

In this example DMAO was reacted with methacrylyl chloride to produce 3,5-dimethyl-1-adamantylmethacrylate. More specifically 27 g. (0.15 mole) of DMAO were dissolved in 200 ml. of benzene, 65 ml. (0.47 mole) of triethylamine were added and 30 ml. (0.31 mole) of methacrylyl chloride were added dropwise to the mixture while cooling and stirring. The mixture was then stirred overnight to insure completion of the reaction. Triethylamine and HCl formed were removed by washing the mixture successively with water, aqueous NaOH and water, following which the mixture was dried over $MgSO_4$. A small amount of free radical inhibitor was added, the solvent was distilled off and the reaction product was then vacuum distilled to recover the methacrylate ester. This product was a colorless liquid having a slight sweet odor and the following properties:

| | |
|---|---|
| Density, 20°/4° | 1.004 |
| Refractive index, 20°/D | 1.4890 |

EXAMPLE 4

This example illustrates the preparation of polymer from 3,5-dimethyl-1-adamantylacrylate. The reaction was carried out in a dried container which had been carefully purged with nitrogen to exclude air. The reaction mixture consisted of 1.0 g. of the acrylate product prepared in Example 1 and 5 ml. of benzene to which had been added 0.003 g. of benzoyl peroxide as a free radical initiator (0.3% by weight based on the monomer). The mixture was heated to and maintained at 65° C. for 16 hours, resulting in a viscous solution of polymer in benzene. This solution was poured into absolute methanol to precipitate the polymer, which was separated, dried and pulverized to yield a white amorphous powder. Properties of this poly (dimethyladamantylacrylate) product were as follows:

| | |
|---|---|
| Molecular weight ($\overline{M}n$ by osmometry) | 141,000 |
| Density (20°/4°) | 1.014 |
| Inherent viscosity (in benzene at 100° F.) | 0.35 |
| Glass transition temperature ($T_g$) | 100° C. |
| Refractive index (20°/D) | 1.50 |

EXAMPLE 5

A series of polymerization runs was made with 3,5-dimethyl-1-adamantylacrylate as the monomer, benzene as solvent and a reaction temperature of about 60° C. In each run a solution of 1.0 g. of the monomer in 4–5 ml. of benzene containing a small amount of initiator was prepared and the mixture was degassed by freezing and evacuation. The degassed mixture was heated under nitrogen to about 60° C. and maintained at that temperature for times as shown in Table 1. In Run Nos. *a–e*, the initiator was benzoyl peroxide (designated "BP") and in Run Nos. *f* and *g*, azobisisobutyronitrile ("AIBN"), the proportions of initiator being shown in Table I. After the reaction the polymer was precipitated from solution, separated and dried. Typically the polymer thus obtained in a white powder which when heated and molded gives a clear, colorless article. Also typically, all of these polyacrylates have glass transition temperatures ($T_g$) of 100° C. or above.

TABLE I.—PREPARATION OF POLY(DIMETHYLADAMANTYLACRYLATES)

| Run No. | Initiator (percent) | Reaction time, hrs. | Polymer yield, percent | R.I., 20/D | Inherent viscosity [1] | Density, 20/4 | M.P.,° C. (capillary) | $T_g$, ° C. |
|---|---|---|---|---|---|---|---|---|
| a | BP (0.12) | 64 | 72 | | 0.65 | | 200 d. | 100 |
| b | BP (0.24) | 17 | 73 | 1.502 | 0.59 | | d.>280 | 100 |
| c | BP (0.26) | 19 | 68 | 1.508 | 0.39 | 1.04 | | 100 |
| d | BP (0.36) | 19 | 50 | 1.496 | 0.47 | 1.02 | 290 d. (softens 170) | 100 |
| e | BP (0.37) | 17 | 71 | 1.496 | 0.50 | | d.>245 | 100 |
| f | AIBN (0.14) | 66 | 98+ | | 0.34 | 1.09 | | 106 |
| g | AIBN (0.08) | 40 | 98+ | | 0.44 | | | |

[1] In benzene at 100° F. and concentration of 0.5 g./100 ml. of benzene.

EXAMPLE 6

Another series of runs was made in generally the same manner as in the above series except that a methacrylate monomer was used, viz. 3,5-dimethyl-1-adamantylmethacrylate, prepared by the procedure of Example 3. All of the polymer products were white powders and when molded into discs gave clear, colorless articles. Results are given in Table II.

TABLE II.—PREPARATION OF POLY(DIMETHYLADAMANTYLMETHACRYLATES)

| Run No. | Initiator (percent) | Reaction time, hrs. | Polymer yield, percent | R.I., 20/D | Inherent viscosity [1] | Density, 20/4 | $T_g$, ° C. |
|---|---|---|---|---|---|---|---|
| h | BP (0.20) | 44 | 20 | | 0.55 | | 190 |
| i | AIBN (0.10) | 70 | 45 | | 0.65 | | 178–193 |
| j | AIBN (0.10) | 88 | 62 | 1.508 | 0.89 | 1.052 | 197–190 |
| k | AIBN (0.09) | 40 | 71 | | 0.90 | 1.046 | 196 |
| l | AIBN (0.10) | 71 | 85 | | 0.86 | 1.014 | 204 |

[1] In benzene at 100° F. and concentration of 0.5 g./100 ml. of benzene.

The following examples relate to the various and diverse copolymers of dimethyladamantyl methacrylate (DMAMA) methyl methacrylate, styrene, acrylonitrile and vinyl chloride respectively. In the examples the methyl methacrylate, styrene and acrylonitrile employed were the constant boiling fraction from commercial materials having >98% purity as shown by gas chromatography. The vinyl chloride was employed directly from a commercial gas cylinder (Matheson, Coleman and Bell Co.). The DMAMA was prepared as shown in Example 3. After the distillations, the purified DMAMA was stored in Dry Ice until used. The purity was always at least 98%. The poly(dimethyladamantyl methacrylate) (PDMAMA) used as a comparison is that designated in Run No. $k$ of Table II in Example 6.

Various evaluation procedures were used in determining the relative merits of the DMAMA copolymers relative to the relevant homopolymers.

(1) Inherent viscosities

All viscosities were obtained at a concentration of 0.5 g./dl. at 100° F. Duplicate runs were made and flow times were reproducible within 0.2 second. Inherent viscosity is represented by the equation:

$$\eta_{inherent} = \ln \frac{\eta_{relative}}{C}$$

where $$\eta_{relative} = \frac{t}{t_0}$$

$t_0$ = flow time through a viscometer of a liquid reference
$t$ = flow time through the same viscometer of dilute solution of polymer in the reference liquid
$c$ = concentration of polymer in solution expressed in grams/deciliter (2) Molecular weights All molecular weights were obtained by membrane osometry and are number average molecular weights.

(3) Glass transition temperatures

These were obtained by one of two methods: differential scanning calorimetry (Perkin-Elmer Model DSC–1B) or differential thermal analysis, the latter being the preferred method in most instances.

(4) Tensile properties

Tensile bars were molded and evaluated for stress, elongation, and modulus.

(5) Percent shrinkage

This was calculated from the densities of the copolymer and comonomer mix. Copolymer densities were determined experimentally, and the density of a comonomer mix was calculated by assuming a linear dependence of density upon weight fraction. It was found experimentally that refractive index was linear with respect to weight fraction, and hence, it is a valid assumption that density (also a colligative property) would possess the same linear dependence.

(6) Scratch resistance

This was determined by scratching the polymer surface with lead pencils of hardness 2H–6H. Scratch resistance was expressed as a value between that which scratched the surface and that which did not. 5H<S<6H means that a 6H pencil scratched the surface but a 5H pencil did not.

(7) Flow rate for PVC copolymers

Flow rates were measured using a Carver press. A weighed amount of polymer was placed between two sheets of aluminum foil and subjected to 5000 lbs. pressure at 165° C. for 10 seconds. The area of the resultant film was measured with a planimeter, and flow rate was expressed as area per unit weight. A minimum of three determinations were run for each sample and averaged. The flow rate relative to PVC was the ratio of the average sample flow rate to the average PVC flow rate.

(8) Degree of polymerization (DP)

homopolymer $$DP = \frac{\text{molecular wt. polymer}}{\text{molecular wt. monomer}}$$

copolymer $$DP = \frac{\text{molecular wt. copolymer}}{\text{average molecular wt. monomers}}$$

EXAMPLE 7

This example illustrates the preparation of a copolymer from 3,5-dimethyl-1-adamantylmethacrylate (DMAMA) and methyl methacrylate (MMA).

Comonomers, solvent and initiator were charged into a heavy walled 50 cc. polymerization tube which was degassed and sealed off under vacuum. The tube was placed in a constant temperature bath a 60° C. ±0.1° C. for a given time period, then cracked open and the contents diluted with 2 cc. of toluquinone. The solution was poured into excess methanol, and then precipitated. Copolymer was filtered, dried, and weighed to determine percent conversion. It was then purified by redissolving in benzene and reprecipitating from methanol twice. Finally, it was dried in a vacuum oven at 50° C. overnight. The copolymerization data for a number of runs are summarized in Table III.

The polymethyl methacrylate (PMMA) was a commercial grade of powder from Eastman Organic Chemical Company. A comparison of the properties of PMMA, PDMAMA and two copolymer samples is shown in Table IV.

TABLE III.—DMAMA-METHYL METHACRYLATE COPOLYMERIZATIONS

Solvent: Benzene
Initiator: Benzoyl peroxide

| Run Number | 241 A | 242 B | 246 C | 247 D | 247 E | 251 F | 253 G | 253 H | 254 I | 261 | 262 | 273 A | 273 B |
|---|---|---|---|---|---|---|---|---|---|---|---|---|---|
| Weight DMAMA, g [a] | 1.004 | 2.008 | 1.004 | 1.004 | 2.008 | 3.012 | 2.008 | 1.004 | 2.008 | 6.43 | 2.51 | 2.309 | 1.406 |
| Weight MMA, g [a] | 0.936 | 0.936 | 1.872 | 2.808 | 2.808 | 0.936 | 0.468 | 4.680 | 0.187 | 3.56 | 8.99 | 0.936 | 0.936 |
| Weight initiator, mg | 2.0 | 3.0 | 3.0 | 4.0 | 5.0 | 4.0 | 2.5 | 6.0 | 2.2 | 10.0 | 11.5 | 3.2 | 2.3 |
| Volume solvent, cc | 2.0 | 3.0 | 3.0 | 4.0 | 5.0 | 4.0 | 2.5 | 6.0 | 2.2 | 40 | 60 | 3.2 | 2.3 |
| Time run, hrs | 1.5 | 2.0 | 2.5 | 2.3 | 2.1 | 2.0 | 2.0 | 2.5 | 3.5 | 64 | 64 | 5.0 | 5.0 |
| Weight copolymer, g | 0.053 | 0.024 | 0.167 | 0.226 | 0.215 | 0.135 | 0.043 | 0.521 | 0.072 | 4.3 | 7.4 | 0.743 | 0.486 |
| Yield copolymer, percent | 2.7 | 0.8 | 5.8 | 7.0 | 4.5 | 3.4 | 1.7 | 10.3 | 3.4 | 43 | 64 | 22.9 | 20.8 |
| Elemental analysis: | | | | | | | | | | | | | |
| C | 69.82 | 68.90 | 66.54 | 65.58 | 67.44 | 72.81 | 73.64 | 63.78 | 74.52 | 72.12 | 64.27 | 73.50 | 71.41 |
| H | 9.18 | 9.15 | 8.73 | 8.54 | 8.70 | 9.52 | 9.52 | 8.52 | 9.58 | 8.93 | 8.52 | 9.49 | 9.07 |
| O [b] | 21.00 | 21.95 | 24.73 | 25.88 | 23.86 | 17.67 | 16.84 | 27.70 | 15.90 | 18.95 | 27.21 | 17.01 | 19.52 |
| DMAMA in copolymer, weight percent | 0.57 | 0.49 | 0.38 | 0.32 | 0.44 | 0.74 | 0.79 | 0.22 | 0.84 | 0.69 | 0.25 | 0.78 | 0.66 |

[a] Monomers were charged volumetrically. Using a 1.0 cc. pipet to charge monomer and calculating the weight by means of the density, rather than weighing directly results in an experimental error of less than 1%.
[b] Determined from C,H analysis by difference.

TABLE IV.—COPOLYMER PROPERTIES: DMAMA-MMA

| Property | PMMA | PDMAMA | 261 | 262 |
|---|---|---|---|---|
| Weight fraction, DMAMA | (0.00) | (1.00) | 0.70 | 0.25 |
| Mole fraction, DMAMA | (0.00) | (1.00) | 0.48 | 0.12 |
| $\eta_{inh}$(Benzene, 100° F.) | 0.96 | 0.90 | 1.24 | 1.17 |
| Mn | [1] 345,000 | 348,000 | 204,000 | 144,000 |
| D.P. | 3,450 | 1,400 | 1,000 | 1,050 |
| Tg, °C. (DSC) | 115 | 196 | 155 | 128–130 |
| Refractive index ($\eta_D^{20}$) | 1.490–1.494 | 1.508–1.512B | 1.506–1.510B | 1.494–1.498B |
| Density | 1.17 | 1.046 | 1.05 | 1.139 |
| Shrinkage, percent | 24 | 4 | 7 | 18 |
| Shore D hardness | 89 | 83 | [2] 70 | 83–84 |
| Scratch resistance, S | >6H | 5H<S<6H | 5H<S<6H | >6H |
| Disc clarity | [3] | [3] | | [3] |
| Tensile properties: | | | | |
|   Stress, p.s.i. | 7,780 | | | 5750 |
|   Elongation, percent | 3.5 | | | 2.7 |
|   Modulus, p.s.i. | 295,000 | | | 347,000 |

[1] Calculated: $[\eta]=6.74\times10^{-5}M^{.75}$. [W. R. Moore and R. J. Fort, J. Polymer Sci., A1, 929 (1963).]
[2] Sample cracked at 75–78.
[3] Excellent.
NOTE.—B=Birefringent.

The copolymers exhibit higher $T_g$ than PMAA and are at least as stable to thermal decomposition (to ~300° C.). The shrinkage of the copolymers upon polymerization is an improvement over PMMA.

EXAMPLE 8

This example illustrates the preparation of a copolymer from 3,5-dimethyl-1-adamantyl methacrylate and styrene. The same procedure as in Example 7 was followed and the results are shown in Table V.

The polystyrene was prepared under the same procedure and conditions as the PDMAMA and the copolymers. A comparison of PDMAMA, polystyrene and one copolymer is shown in Table V.

TABLE V.—DMAMA-STYRENE COPOLYMERIZATIONS
Solvent: Benzene
Initiator: Benzoyl Peroxide

| Run number | 265-2 | 266-3 | 266-4 | 268-5 | 268-6 | 276 |
|---|---|---|---|---|---|---|
| Weight DMAMA, g [a] | 1.004 | 3.012 | 2.008 | 5.020 | 5.020 | 4.02 |
| Weight styrene, g [a] | 2.718 | 0.906 | 0.906 | 0.906 | 0.453 | 7.25 |
| Weight initiator, mg | 4.0 | 4.0 | 3.0 | 6.0 | 5.5 | 12.4 |
| Volume solvent, cc | 4.0 | 4.0 | 3.0 | 6.0 | 5.5 | 12 |
| Time run, hrs | 2.5 | 3.0 | 3.0 | 3.8 | 3.8 | 22 |
| Weight copolymer, g | 0.109 | 0.15 | 0.11 | 0.469 | 0.580 | 2.0 |
| Yield copolymer, percent | 2.0 | 4 | 4 | 7.9 | 10.6 | 18 |
| I.R. analysis, weight percent DMAMA | 0.28 | 0.73 | 0.62 | 0.76 | 0.85 | 0.43 |
| U.V. analysis, weight percent DMAMA | 0.25 | 0.78 | 0.69 | 0.84 | 0.90 | |
| Average copolymer composition, weight percent DMAMA | 0.27 | 0.76 | 0.66 | 0.88 | 0.80 | 0.43 |

[a] Charged volumetrically.

TABLE VI.—COPOLYMER PROPERTIES: DMAMA-STYRENE

| Property | Polystyrene | PDMAMA | 276 |
|---|---|---|---|
| Weight fraction, DMAMA | (0.00) | (1.00) | .43 |
| Mole fraction, DMAMA | (0.00) | (1.00) | .23 |
| $\eta_{inh}$ (benzene, 100° F.) | 0.67 | 0.90 | 0.83 |
| Mn | [1] 160,000 | 348,000 | 272,000 |
| D.P. | 1,540 | 1,400 | 1,640 |
| Tg, °C. (DSC) | 103 | 196 | 121 |
| Refractive index ($\eta_D^{20}$) | 1.586–1.590 | 1.508–1.512B | 1.558–1.562 |
| Density | 1.04 | 1.046 | 1.038 |
| Shrinkage, percent | 14 | 4 | 10 |
| Shore D hardness | 80 | 83 | 85 |
| Scratch resistance, S | 2H<S<3H | 5H<S<6H | 3H<S<4H |
| Disc clarity | [2] | [2] | [2] |
| Tensile properties: | | | |
|   Stress, p.s.i. | 6,100 | | 5,000 |
|   Elongation, percent | 2.5 | | 1.25 |
|   Modulus, p.s.i. | 259,000 | | 240,000 |

[1] Calculated from viscosity in benzene at 30° C.: $[\eta]=9.7\times10^{-5} M^{.75}$ $\eta=0.69$ [Styrene, R. H. Boundy and R. F. Boyer, ea. (1952), p. 334.]
[2] Excellent.

The $T_g$ of the copolymer was raised to the point where molded articles would be heat sterilizable and at the same time, mold shrinkage is reduced. Surface hardness is improved (copolymer exhibiting greater surface hardness than either homopolymer).

EXAMPLE 9

This example illustrates the preparation of a copolymer from 3,5-dimethyl-1-adamantyl methacrylate and acrylonitrile. The same procedure as in Example 7 was followed. In the purification procedure, however, several of the copolymers were dissolved in dimethylformamide (DMF) and precipitated from methanol. All samples were dried in a vacuum oven at 50° C. to constant weight to insure solvent removal. Copolymerization data is summarized in Table VII.

The polyacrylonitrile (PAN) was prepared by the same method as the copolymers, however, because of the intractible nature of PAN and the resulting difficulties in molding some of the values thereof in Table VII are from the literature. Table VII shows a comparison of the properties of PAN PDMAMA and three samples of copolymer.

TABLE VII.—DMAMA-ACRYLONITRILE COPOLYMERIZATIONS
Solvent: N,N-Dimethyl Acetamide (DMAC)
Initiator: Benzoyl Peroxide

| Run number | 279-P | 280-Q | 280-R | 280-S | 281-T | 284-U | 284-X | 298 | 510 |
|---|---|---|---|---|---|---|---|---|---|
| Weight DMAMA, g [a] | 1.004 | 3.012 | 1.004 | 1.004 | 4.016 | 1.004 | 3.012 | 3.012 | 1.205 |
| Weight acrylonitrile, g [a] | 0.806 | 0.806 | 2.418 | 1.612 | 0.403 | 4.836 | 0.806 | 13.702 | 24.18 |
| Weight initiator, mg | 2.0 | 4.0 | 3.4 | 2.6 | 4.5 | 5.8 | 4.0 | 16.7 | 3.1 |
| Volume solvent, cc | 2.0 | 4.0 | 4.0 | 3.0 | 4.5 | 7.0 | 4.0 | 20 | 25 |
| Time run, hrs | 4 | 4 | 2.3 | 2.0 | 2.0 | 2.0 | 2.0 | 7.0 | 18 |
| Weight copolymer, g | 0.2 | 0.8 | 0.254 | 0.18 | 0.90 | 0.42 | 0.53 | 3.5 | [b] 14.7 |
| Yield copolymer, percent | 11 | 21 | 7.4 | 6.9 | 20 | 7.2 | 13.8 | 21 | 63 |
| Purification solvent | Benzene | Benzene | DMF | Benzene | Benzene | DMF | Benzene | DMF | DMF |
| Elemental analysis: | | | | | | | | | |
|   C | 75.10 | 76.46 | 72.99 | 71.58 | 76.75 | 70.19 | 76.47 | 69.59 | 66.86 |
|   H | 8.65 | 9.46 | 8.17 | 8.18 | 9.44 | 7.97 | 9.50 | 7.57 | 6.40 |
|   N | 6.19 | 3.53 | 9.70 | 8.42 | 1.63 | 14.27 | 2.79 | 14.51 | 22.14 |
|   O [c] | 10.06 | 10.55 | 9.14 | 10.82 | 12.18 | 7.57 | 11.24 | 8.33 | 9.54 |
| DMAMA in copolymer, weight percent [d] | 0.77 | 0.87 | 0.63 | 0.68 | 0.94 | 0.46 | 0.89 | 0.45 | 0.16 |

[a] Charged volumetrically.
[b] The material in the polymerization vessel had become a hard rubbery white mass. Soluble polymer was extracted by treatment with DMAC and DMF.
[c] By difference.
[d] Calculated from nitrogen analysis.

TABLE VIII.—COPOLYMER PROPERTIES: DMAMA-ACRYLONITRILE

| Property | PAN | PDMAMA | 298-ANC [1] | 298 | 510 |
|---|---|---|---|---|---|
| Weight fraction, DMAMA | (0.00) | (1.00) | >0.79 | 0.45 | 0.16 |
| Mole fraction, DMAMA | (0.00) | (1.00) | >0.44 | 0.15 | 0.04 |
| $\eta_{inh}$ (DMF, 100° F.) | 0.68 | [2] 0.90 | 1.5 | 1.26 | 1.93 |
| $M_n$ | [3] 29,200 | 348,000 | 517,000 | 50–100,000 | 50–100,000 |
| D.P. | 550 | 1,400 | ~2,300 | 350–700 | 600–1,200 |
| $T_g$, ° C. (DTA) | 98 | 196 | 136–155 | 110 | (115) |
| Refractive index ($\eta_D^{20}$) | [4] 1.518 | 1.508–1.512B | 1.514–1.518 | 1.530–1.534 | 1.518–1.522B |
| Density | [5] 1.17–1.18 | 1.046 | 1.064 | 1.076 | 1.130 |
| Shrinkage, percent | 46 | 4 | 10 | 28 | 38 |
| Shore D hardness | | 83 | 86–7 | 75–8 | 68.83 |
| Scratch resistance, S | | 5H<S<6H | 5H<S<6H | 5H<S<6H | >6H |
| Molding temperature, ° C | | 220 | 170 | 120–150 | 150 |
| Color of molded specimen | | ([6]) | ([6]) | ([6]) | ([7]) |
| Clarity of molded specimen | | ([8]) | ([8]) | ([8]) | ([8]) |

[1] Blend of run Nos. 280-Q, 281-T and 284-X.
[2] Determined in benzene at 100° F.
[3] Calculated from viscosity in DMF: $[\eta]=31.7 \times 10^{-5} M^{0.746}$. [Polymer Handbook, J. Brandrup and E. H. Immergut, ed. p. iv-23.]
[4] R. Chaing, J. Polymer Sci., A1 2765 (1963).
[5] T. Kobayashi, Bull. Chem. Soc. Japan, 35 726 (1962).
[6] Clear.
[7] Yellow.
[8] Excellent.

The color of the copolymers was considerably improved over PAN which is yellow to brownish color prior to heating and upon heating darkens. The copolymers are fine white powders that molded easily. Copolymers containing at least 50 wt. percent DMAMA (18 mole percent) are completely colorless when molded and have excellent clarity. The copolymer of only 15–20 wt. percent DMAMA (~5 mole percent) was slightly yellow after molding, but still possessed good clarity.

The solubility characteristics of the copolymers were also improved over PAN. Copolymers containing at least 50 wt. percent DMAMA were completely soluble in benzene and other aromatic hydrocarbons. PAN is only slightly soluble in such highly polar solvents as dimethylformamide and dimethylacetamide. Sample 298 containing 15–20 wt. percent DMAMA had a $T_g$ of 110° C. This sample was easily molded in a clear, thin film, which when stretched to twice its original length under a heat lamp exhibited a small degree of orientation as evidenced by X-ray analysis. There was considerable improvement in shrinkage over PAN although Shore D hardness for this copolymer (298) was a little lower than other samples. Sample 298–ANC although somewhat brittle, yielded upon molding a completely clear colorless material with good Shore D hardness and excellent shrinkage (only 4%) 298–ANC also exhibited the highest degree of solubility in benzene.

EXAMPLE 10

This example illustrates the preparation of a copolymer from 3,5-dimethyl-1-adamantyl methacrylate and vinyl chloride. Copolymerizations were run in small (100 cc.) pressure bottles using Buta N liners and bottle caps. The bottles were wrapped with insulating tape.

The DMAMA, initiator and solvent were charged into the bottle and degassed by the freeze-thaw process. The bottle was flushed with nitrogen, quickly capped tightly, and froze in a Dry Ice bath. Vinyl chloride was condensed directly from a cylinder into the bottle, and as the bottle warmed up, a small amount of vinyl chloride was allowed to escape to produce an added sweep of gases from the polymerization vessel. The bottle was held at 50.0° C. ±0.1° C. in a constant temperature bath for a given time period. The excess vinyl chloride was then allowed to escape and the bottle was opened. The solution was poured into methanol and the precipitated copolymer was isolated as a fine white powder. The copolymers were purified by dissolving in tetrahydrofuran and re-precipitating from methanol twice. All were dried to constant weight in a vacuum oven at 50° C. The copolymerization data is summarized in Table IX.

All of the vinyl chloride copolymers were stabilized before molding. (Elemental analyses were obtained before stabilization.) The stabilizer used was a barium-cadmium compound. Advastab BC–103A (Advance Division, Carlisle Chemical Works, Inc.). Concentration used was 2 parts pere hundred by weight, measured volumetrically with a hypodermic needle assuming a stabilizer density of 1.00. In general, 10 drops were equivalent to 0.1 ml., so for very small amounts, the material was measured in drops. The procedure was to slurry the polymer powder in pentane, add the stabilizer, and stir the mixture briskly as the pentane evaporated. The last traces of pentane were removed by heating the copolymer in a vacuum oven at 45–50° C. at least overnight.

The polyvinyl chloride used for comparison was B. F. Goodrich Company's Geon 101. The results of the comparisons are shown in Table IX.

TABLE IX.—DMAMA-VINYL CHLORIDE COPOLYMERS

Solvent: Chlorobenzene
Initiator: Azobisisobutyronitrile

| Number | 519 | 521 | 528 | 529 | 532 |
|---|---|---|---|---|---|
| Weight DMAMA, g [a] | 1.10 | 1.2 | 2.0 | 3.0 | 3.0 |
| Weight vinyl chloride, g | 26.2 | 25.4 | 17.2 | 3.7 | 1.5 |
| Weight initiator, g | 0.203 | 0.18 | 0.194 | 0.377 | 0.031 |
| Volume solvent, cc | [b] 20 | 20 | 20 | 5 | 4 |
| Time run, hrs | 23 | 12 | 6.5 | 5.0 | 4.0 |
| Weight copolymer, g | 23.4 | 6.5 | 4.7 | 1.4 | [c] 1.5 |
| Yield copolymer, percent | 86 | 25 | 24 | 21 | 43 |
| Elemental analysis: | | | | | |
| C | | 43.32 | 55.81 | 73.12 | 74.31 |
| H | | 5.51 | 1.41 | 9.44 | 9.71 |
| Cl | | 46.49 | 31.43 | 6.34 | [d] 2.86 |
| O [e] | | 4.68 | 11.35 | 11.10 | 13.12 |
| DMAMA in copolymer, weight percent = | | 0.18 | 0.45 | 0.89 | 0.95 |

[a] Charged volumetrically.
[b] Solvent was cyclohexane.
[c] Calculated from chlorine content.
[d] Average of two values.
[e] By difference.

TABLE X.—COPOLYMER PROPERTIES: DMAMA–VINYL CHLORIDE

| Property | PDMAMA | PVC | 521 | 529 | 529 | 532 |
|---|---|---|---|---|---|---|
| Weight fraction, DMAMA | (1.00) | (0.00) | 0.18 | 0.45 | 0.89 | 0.95 |
| Mole fraction, DMAMA | (1.00) | (0.00) | 0.05 | 0.17 | 0.67 | 0.83 |
| $[\eta]_{inh}$ (THF, 30° F.) | 0.56 | 1.04 | 0.47 | 0.30 | 0.30 | 0.39 |
| $\overline{Mn}$ | 239,000 | [1] 90,500 | 24,300 | 25,300 | 82,600 | 61,300 |
| DP | 964 | 1,450 | 253 | 173 | 362 | 256 |
| Tg, °C. (DTA) | 190 | 82 | 83 | 98 | 117 | 107 |
| Refractive index $(\eta_D^{20})$ | 1.508B | 1.536–1.540B | 1.536 | 1.536–1.540 | 1.516–1.520 | 1.512–1.516 |
| Flow rate, relative to PVC [2] | | (1.00) | 3.9 | 6.8 | [3] | 2.8 |
| Color of molded specimen [2] | [4] | [5] | [4] | [4] | [4] | [4] |
| Clarity of molded specimen | [6] | [6] | [7] | [6] | [7] | [7] |

[1] Calculated from THF viscosity, $[\eta]=219 \times 10^{-5}$ M$^{-54}$., H. N. Friedlander, L. H. Peebles, Jr., J. Brandrupurd, J. R. Kirby, Macromolecules, 1, 79 (1968).
[2] Flow properties and properties of molded specimens were determined on stabilized samples at 165° C., 5000 p.s.i.
[3] No fusion.
[4] Clear.
[5] Green.
[6] Excellent.
[7] Good.

The invention claimed is:
1. A copolymer prepared from an unsaturated ester corresponding to the formula

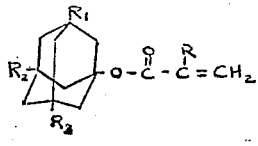

wherein R is hydrogen or methyl and $R_1$ and $R_2$ are radicals having 0–20 carbon atoms selected from the group consisting of hydrogen alkyl and cycloalkyl and $R_3$ is a radical having 1–20 carbon atoms selected from the group consisting of alkyl and cycloalkyl and a second polymerizable unsaturated monomer.

2. The copolymer according to claim 1 wherein the copolymer contains 5 to 95 wt. percent of the adamantane moiety.

3. The copolymer according to claim 2 wherein the copolymer contains 20 to 90 wt. percent of the adamantane moiety.

4. A polymer according to claim 2 wherein the second polymerizable unsaturated monomer is selected from the group consisting of ethylene, propylene, butadiene, vinylcyclohexene, dicyclopentadiene, vinylacetate, acrylonitrile, methacrylonitrile, styrene, α-methylstyrene, α-chlorostyrene, vinylpyrrolidone, vinylpyridine, maleic anhydride, methylvinyl ether and ethylvinyl ether.

5. A polymer according to claim 4 wherein the moiety

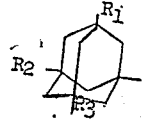

is selected from the group consisting of 1-methyladamantyl, 1,3-dimethyladamantyl, 1-ethyladamantyl, 1-methyl-3-ethyladamantyl, 1,3,5-trimethyladamantyl, and 1,3-dimethyl-5-ethyladamantyl.

6. A polymer according to claim 1 wherein the unsaturated ester is an acrylate.

7. A polymer according to claim 1 wherein the unsaturated ester is a methacrylate.

8. A polymer according to claim 4 wherein the unsaturated ester is an acrylate.

9. A polymer according to claim 4 wherein the unsaturated ester is a methacrylate.

10. A polymer according to claim 5 wherein the unsaturated ester is an acrylate.

11. A polymer according to claim 5 wherein the unsaturated ester is a methacrylate.

References Cited

UNITED STATES PATENTS 3,342,880    9/1967    Reinhardt _____ 260—89.5

HARRY WONG, Jr., Primary Examiner

U.S. Cl. X.R.

204—159.22; 260—30.4, 83.5, 85.5, 86.1, 86.3, 86.7, 89.5, 486